(12) United States Patent
Parent et al.

(10) Patent No.: US 7,176,017 B2
(45) Date of Patent: Feb. 13, 2007

(54) TRIPHASIC BIOREACTOR AND PROCESS FOR GAS EFFLUENT TREATMENT

(75) Inventors: Carmen Parent, Québec (CA); Frédéric Dutil, Québec (CA)

(73) Assignee: CO$_2$ Solution Inc., Quebec (CA)

( * ) Notice: Subject to any disclaimer, the term of this patent is extended or adjusted under 35 U.S.C. 154(b) by 624 days.

(21) Appl. No.: 10/195,848

(22) Filed: Jul. 12, 2002

(65) Prior Publication Data
US 2003/0022364 A1     Jan. 30, 2003

(30) Foreign Application Priority Data
Jul. 13, 2001   (CA)   ................................... 2353307

(51) Int. Cl.
*C12M 1/12*   (2006.01)
(52) U.S. Cl. .................. 435/297.1; 435/297.2; 435/299.1
(58) Field of Classification Search ............... None
See application file for complete search history.

(56) References Cited

U.S. PATENT DOCUMENTS

| | | | |
|---|---|---|---|
| 4,033,822 A | 7/1977 | Gregor | 195/68 |
| 4,602,987 A | 7/1986 | Bonaventura et al. | 204/129 |
| 4,743,545 A | 5/1988 | Torobin | 435/41 |
| 4,758,417 A | 7/1988 | Van Lookeren-Campagne et al. | 423/331 |
| 4,761,209 A | 8/1988 | Bonaventura et al. | 204/129 |
| 5,130,237 A | 7/1992 | Thomas et al. | 435/98 |
| 5,250,305 A | 10/1993 | Hamada | 426/46 |
| 5,593,886 A | 1/1997 | Gaddy | 435/252.7 |
| 5,614,378 A | 3/1997 | Yang et al. | 435/41 |
| 5,618,430 A | 4/1997 | Fuchs | |
| 5,807,722 A | 9/1998 | Gaddy | 435/140 |

(Continued)

FOREIGN PATENT DOCUMENTS

CA   2029101   5/1992

(Continued)

OTHER PUBLICATIONS

"Promotion of Oxygen Transfer in Three-Phase Fluidized-Bed Bioreactors by Floating Bubble Breakers" by Y. Kang et al.

(Continued)

*Primary Examiner*—David Redding
(74) *Attorney, Agent, or Firm*—Ware Fressola, Van Der Sluys & Adolphson (57) ABSTRACT

A triphasic bioreactor for physico-chemically treating a gas is disclosed. The triphasic bioreactor comprises a reaction chamber with a liquid and biocatalysts in suspension in the liquid, for catalyzing a reaction between the gas and the liquid to obtain a treated gas and a solution containing a reaction product. A gas bubbling means is provided in the reaction chamber for bubbling the gas to be treated into the liquid thereby dissolving the gas into the liquid and increasing a pressure inside the reaction chamber. The bioreactor further comprises a liquid inlet in fluid communication with the reaction chamber for receiving the liquid and filling the reaction chamber, a liquid outlet in fluid communication with the reaction chamber for releasing the solution and a gas outlet in fluid communication with the reaction chamber to release the treated gas. The bioreactor further comprises a retention device to retain the biocatalysts in the reaction chamber. The invention also concerns a process using the triphasic bioreactor. The triphasic bioreactor may advantageously be used for removing carbonic dioxide from a CO$_2$-containing gas

14 Claims, 4 Drawing Sheets

U.S. PATENT DOCUMENTS

| | | | | |
|---|---|---|---|---|
| 6,136,577 | A | 10/2000 | Gaddy | 435/161 |
| 6,143,556 | A | 11/2000 | Trachtenberg | 435/289.1 |
| 6,245,304 | B1 | 6/2001 | Jansen et al. | 422/198 |
| 6,257,335 | B1 | 7/2001 | Nguyen et al. | 166/280 |
| 6,432,698 | B1 * | 8/2002 | Gaugler et al. | 435/296.1 |
| 6,524,843 | B1 * | 2/2003 | Blais et al. | 435/266 |

FOREIGN PATENT DOCUMENTS

| | | |
|---|---|---|
| CA | 2222030 | 12/1996 |
| CA | 2232707 | 3/1997 |
| CA | 2160311 | 4/1997 |
| CA | 2238323 | 5/1997 |
| CA | 2259492 | 1/1998 |
| CA | 2291785 | 12/1998 |
| CA | 2268641 | 1/2001 |
| DE | 3937892 | 5/1991 |
| EP | 0328758 | 8/1989 |
| JP | 54132291 | 10/1979 |
| JP | 63129987 | 6/1988 |
| JP | 2109986 | 4/1990 |
| JP | 3216180 | 9/1991 |
| JP | 4075537 | 3/1992 |
| JP | 4190782 | 7/1992 |
| JP | 8116965 | 5/1996 |
| JP | 9057289 | 3/1997 |
| JP | 2000202239 | 7/2000 |
| JP | 2000236870 | 9/2000 |
| JP | 2000267679 | 10/2000 |
| WO | WO 9200380 | 1/1992 |
| WO | WO 9719196 | 5/1997 |
| WO | WO 9800558 | 1/1998 |
| WO | WO 9855210 | 6/1998 |
| WO | 9855210 | 12/1998 |

OTHER PUBLICATIONS

Biotechnololgy & Bioengineering 37 (1991) Mar. 15, No. 6, New York pp. 580-586.

Deshusses M. A. et al.—Transient-State Behavior of a Biofilter Removing Mixtures of Vapors of MEK and MIBK from Air—1995—pp. 587-598, Biotechnology and Bioengineering. vol. 49.

* cited by examiner

TRIPHASIC BIOREACTOR AND PROCESS FOR GAS EFFLUENT TREATMENT

FIELD OF THE INVENTION

This invention relates to the field of gas effluent treatment and air purification. More specifically, it concerns a triphasic bioreactor for the biological treatment of gaseous effluent. The invention also concerns a triphasic process for the biological treatment of gas effluent.

BACKGROUND

Contemporary industrial activities generate gaseous effluents containing a multitude of chemical compounds and contaminants which interfere with the equilibrium of elements in nature and affect the environment at different levels. Acid rain, the greenhouse effect, smog and the deterioration of the ozone layer are examples that speak volumes about this problem. Reduction of noxious emissions is therefore not surprisingly the subject of more and more legislation and regulation. Industrial activities and applications which must contend with strict environmental regulatory standards in order to expect any long term commercial viability, will turn more and more to biological and environmentally safe methods. Consequently, there is a real need for new apparatus and methods aimed at the biological treatment of gaseous waste or effluents.

There already exists a vast array of technologies aimed at the separation and recovery of individual or mixed gases and a number of different biological methods is known to treat gaseous waste or effluents: bacterial degradation (JP 2000-287679; JP2000-236870), fermentation by anaerobic bacteria (WO 98/00558), photosynthesis through either plants (CA 2,029,101 A1; JP04-190782) or microorganisms (JP 03-216180). Among the more popular are those gained through the harnessing of biological processes such as peat biofilters sprinkled with a flora of microorganisms in an aqueous phase, or biofilter columns comprising immobilized resident microorganisms (Deshusses et al. (1996) Biotechnol. Bioeng. 49, 587–598). Although such biofilters have contributed to technological advances within the field of gaseous waste biopurification, the main drawbacks associated with their use are their difficult maintenance and upkeep, lack of versatility, as well as time consuming bacterial acclimation and response to perturbation periods (Deshusses et al.).

A number of biological sanitation/purification methods and products is known to use enzymatic processes, coupled or not to filtration membranes (S5250305; U.S. Pat. No. 4,033,822; JP 63-129987). However, these are neither intended nor adequate for the cleansing of gaseous waste or effluents. The main reason for this is that in such systems, contaminants are generally already in solution (U.S. Pat. No. 5,130,237; U.S. Pat. No. 4,033,822; U.S. Pat. No. 4,758,417; U.S. Pat. No. 5,250;305; WO97/19196; JP 63-129987). Efficient enzymatic conversion and treatability itself of gaseous waste or effluents in liquids therefore depend on adequate and sufficient dissolution of the gaseous phase in the liquid phase. However, the adequate dissolution of gaseous waste or effluents into liquids for enzymatic conversion poses a real problem which constitutes the first of a series of important limitations which compound the problem of further technological advances in the field of gas biopurification.

Although triphasic <<Gas-Liquid-Solid>> (GLS) reactors are commonly used in a large variety of industrial applications, their utilization remains quite limited in the area of biochemical gas treatment (U.S. Pat. No. 6,245,304; U.S. Pat. No. 4,743,545). Also known in the prior art are the GLS bioprocesses abundantly reported in the literature. A majority of these concerns wastewater treatment (JP 09057289). These GLS processes are characterized in that the gaseous intake serves the sole purpose of satisfying the specific metabolic requirements of the particular organism selected for the wastewater treatment process. Such GLS treatment processes are therefore not aimed at reducing gaseous emissions.

As previously mentioned, these systems are neither intended nor adequate for the treatment of gaseous waste or effluents. An additional problem associated with the use of these systems is the non retention of the solid phase within the reactor. Biocatalysts are in fact washed right out of the reactors along with the liquid phase. Different concepts are, nonetheless, based on this principle for the reduction of gaseous emissions, namely carbon dioxide. Certain bioreactors allow the uptake of $CO_2$ by photosynthetic organisms (CA229101;JP03-216180) and similar processes bind $CO_2$ through algae (CA2232707; JP08-116965; JP04-190782; JP04-075537). However, the biocatalyst retention problem remains largely unaddressed and constitutes another serious limitation, along with gaseous effluent dissolution, to further technological advancements.

The main argument against the use of ultrafiltration membranes to solve this biocatalyst retention problem is their propensity to clogging. Clogging renders them unattractive and so their use is rather limited for the retention of catalysts within reactors. However, a photobioreactor for medical applications as an artificial lung (WO9200380; U.S. Pat. No. 5,614,378) and an oxygen recovery system (U.S. Pat. No. 4,602,987; U.S. Pat. No. 4,761,209) are notable exceptions making use of carbonic anhydrase and an ultrafiltration unit.

The patent applications held by the assignee, CO2 Solution Inc., via Les Systèmes Envirobio Inc.(EP0991462; WO9855210; CA2291785) proposes a packed column for the treatment of carbon dioxide using immobilized carbonic anhydrase without the use of an ultrafiltration membrane. Carbonic anhydrase is a readily available and highly reactive enzyme that is used in other systems for the reduction of carbon dioxyde emissions (U.S. Pat. No. 4,602,987; U.S. Pat. No. 4,743,545; U.S. Pat. No. 5,614,378; U.S. Pat. No. 6,257,335). In the system described by Trachtenberg for the carbonic anhydrase treatment of gaseous effluents (U.S. Pat. No. 6,143,556; CA2222030), biocatalyst retention occurs through a porous wall or through enzyme immobilization. However, important drawbacks are associated with the use of enzyme immobilization, as will be discussed below.

Other major drawbacks are associated with the use of enzymatic systems. One of these stems from systems where enzymatic activity is specifically and locally concentrated. This is the case with systems where enzymes are immobilized at a particular site or on a specific part of an apparatus. Examples in point of such systems are those where enzymes are immobilized on a filtration membrane (JP60014900008A2; U.S. Pat. No. 4,033,822; U.S. Pat. No. 5,130,237; U.S. Pat. No. 5,250,305; JP54-132291; JP63-129987; JP02-109986; DE3937892) or even, at a gas-liquid phase boundary (WO 96/40414; U.S. Pat. No. 6,143,556). The limited surface contact area obtainable between the dissolved gas substrate, the liquid and the enzyme's active site poses an important problem. Hence, these systems generate significantly greater waste of input material, such as expensive purified enzymes, because the contact surface with the gaseous phase is far from optimal and limits productive reaction rates. Therefore, as mentioned previously, overcoming the contact surface area difficulty should yield further technological advances.

Other examples of prior art apparatuses or methods for the treatment of gas or liquid effluent are given in the following documents: CA2160311; CA2238323; CA2259492; CA2268641; JP2000-236870; JP2000-287679; JP2000-202239; U.S. Pat. No. 4,758,417; U.S. Pat. No. 5,593,886; U.S. Pat. No. 5,807,722; U.S. Pat. No. 6,136,577; and U.S. Pat. No. 6245304.

SUMMARY OF THE INVENTION

An object of the present invention is to provide an apparatus that is distinct from and overcomes several disadvantages of the prior art bioreactor for the treatment of gas effluent, as will be discussed in detail below.

In accordance with the present invention, that object is achieved with a triphasic bioreactor for physico chemically treating a gas effluent. The triphasic bioreactor comprises a reaction chamber, a liquid inlet and gas and liquid outlets in fluid communication with the reaction chamber. A gas bubbling means is also provided within the reaction chamber for receiving the gas to be treated. The reaction chamber is filled with biocatalysts in suspension in a liquid, for catalyzing a reaction between the gas and the liquid to obtain a treated gas and a solution containing a reaction product. The liquid is preferably an aqueous or organic solution of an appropriate composition with respect to the desired catalytic reaction. The liquid inlet is for receiving the liquid into the reaction chamber and filling it. The gas bubbling means is also for bubbling the gas to be treated into the liquid thereby both dissolving it into the liquid and increasing the gas pressure inside the reaction chamber. The bioreactor further comprises a retention device for retaining the biocatalysts within the reaction chamber while the liquid outlet allows for the pressure release of the solution containing the reaction product.

The triphasic bioreactor of the present invention provides the advantages of biologically treating gaseous waste and effluents while simultaneously providing biocatalysts in liquid suspension, optimizing gas phase dissolution into the liquid phase and thereby optimizing surface contact area between the gas, liquid and solid phases, as well as retaining the biocatalysts within the reactor while allowing the pressure release of liquid containing a reaction product exempt of biocatalysts.

In accordance with a preferred aspect of the invention, the bioreactor comprises a pressure regulating valve to control a pressure created by the gas bubbled within the reaction chamber and a sampling means for sampling and analyzing liquid from the reaction chamber.

The gas bubbling means preferably comprises a gas inlet of the reaction chamber to receive the gas to be treated and a bubbler located in a bottom portion of the reaction chamber. The bubbler has a gas inlet connected to the gas inlet of the reaction chamber and a plurality of gas outlets to diffuse the gas in the reaction chamber. The gas bubbling means further comprises a pipe to connect the gas inlet of the reaction chamber to the gas inlet of the bubbler.

The biocatalysts used in the bioreactor are preferably selected from the group consisting of enzymes, liposomes, microorganisms, animal cells, plant cells and a combination thereof. Most preferably, the biocatalysts are entrapped in porous substrates pervading the reaction chamber. Alternatively, the biocatalysts may be carried by the liquid that feeds the reaction chamber.

The retention device preferably comprises a filter having pores with a smaller diameter than the diameter of the biocatalysts. More preferably, the filter is a membrane filter.

In accordance with a first preferred embodiment, the membrane filter is located inside the reaction chamber upstream from the liquid outlet.

In accordance with a second preferred embodiment, the membrane filter is located outside the reaction chamber. In such a case, the retention device further comprises a first piping means and a second piping means. The first piping means is for piping liquid, which contains biocatalysts and reaction products, from the liquid outlet of the reaction chamber to the membrane filter where a permeate liquid containing the reaction products is separated from a retentate liquid containing the biocatalysts. The second piping means is for piping the retentate liquid to the liquid inlet of the bioreactor.

In accordance with a preferred aspect of the invention, the triphasic bioreactor is used for reducing carbon dioxide contained in a gas effluent. In such a case, the gas effluent to be treated contains carbon dioxide, the liquid filling the bioreactor is an aqueous liquid and the biocatalysts are enzymes capable of catalyzing the chemical conversion of the dissolved carbon dioxide into an aqueous solution containing hydrogen ions and bicarbonate ions. More preferably, the enzymes are carbonic anhydrase.

In accordance with a still further preferred aspect of the invention, the bioreactor comprises an additional reaction chamber, as defined hereinabove, in series with the reaction chamber, hereinafter referred to as the first reaction chamber, to further treat the previously treated gas. In such a case, the biocatalysts filling the first reaction chamber are preferably different from the biocatalysts filling the additional reaction chamber.

The present invention also provides a method for the biocatalytic treatment of gas effluent which is basically a three step process.

First, a reaction chamber filled with biocatalysts is filled with a liquid thereby suspending the biocatalysts in the liquid. Second, a gas to be treated is bubbled into the liquid thereby dissolving it into the liquid and creating a pressure inside the reaction chamber. The bubbling thereby promotes the biocatalytic reaction between the liquid and the gas to be treated in order to obtain a treated gas and a solution containing a reaction product. Third, the solution containing the reaction product is released by pressure from the reaction chamber whilst retaining the biocatalysts within the reaction chamber. During the second and third steps, the pressure is controlled within the reaction chamber and treated gas is released from the reaction chamber.

BRIEF DESCRIPTION OF THE DRAWINGS

Other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DETAILED DESCRIPTION OF PREFERRED EMBODIMENTS OF THE INVENTION

Figure 1:
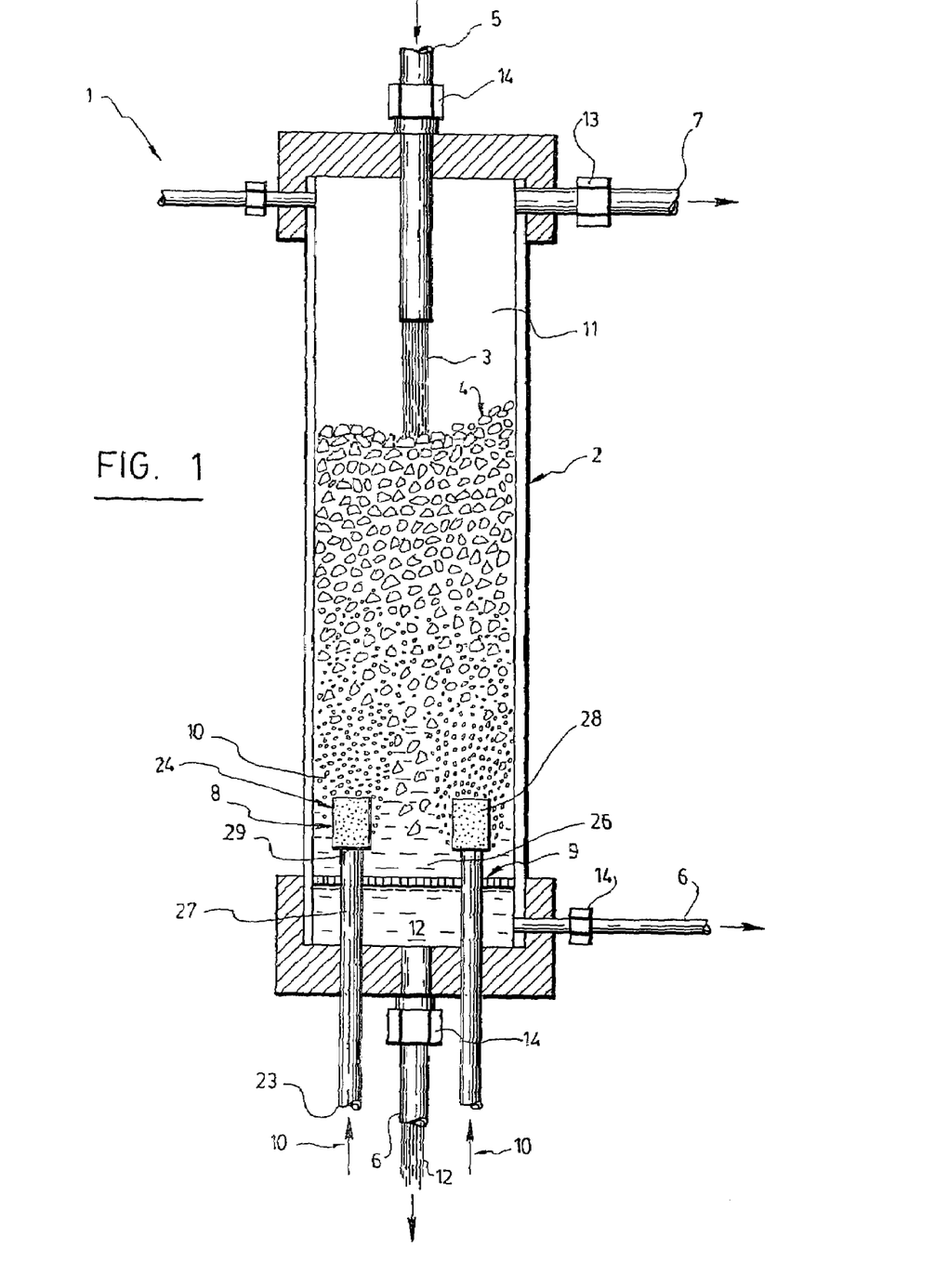
FIG. 1 is a cross-sectional side view of a triphasic bioreactor according to a first preferred embodiment of the invention.
Figure 2:
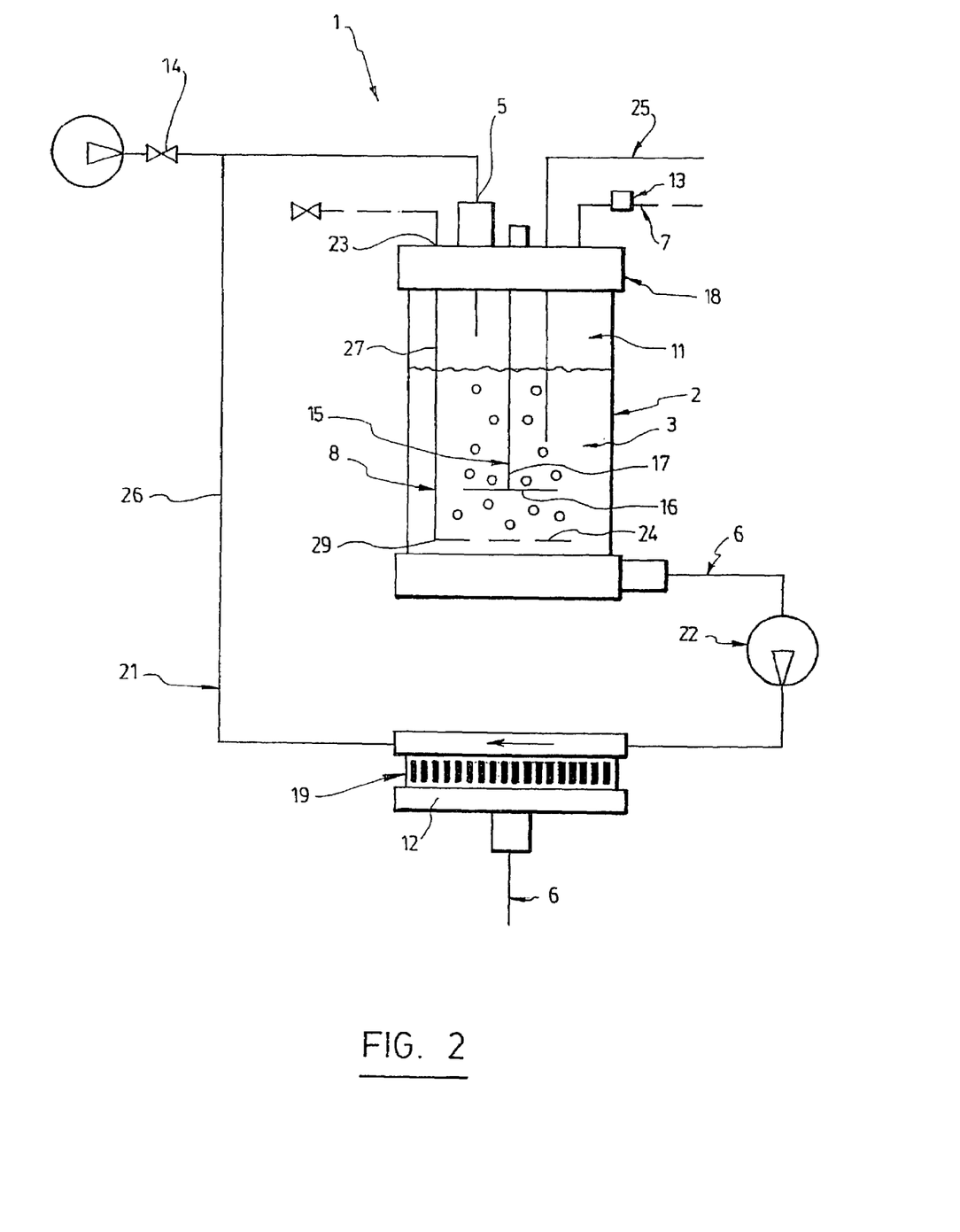
FIG. 2 is a schematic side view of a triphasic bioreactor according to a second preferred embodiment of the invention having an external tangential flow filter.
Figure 3:
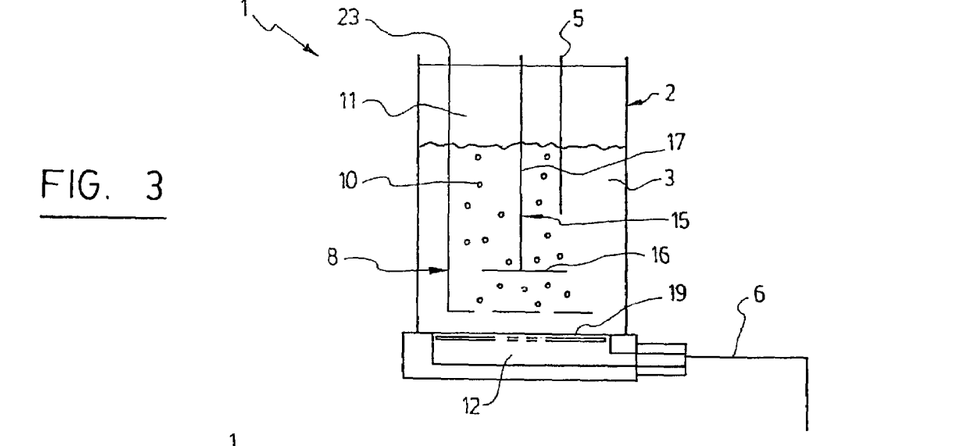
FIG. 3 is a schematic side view of a triphasic bioreactor according to another embodiment of the invention, having an integrated filter.

Referring to FIG. 1 or 2, the triphasic bioreactor (1) is an apparatus for physico-chemically treating a gas (10). Minimally, it features a reaction chamber (2) filled with biocatalysts (4) in suspension in a liquid (3), a liquid inlet (5) and liquid (6) and gas (7) outlets in fluid communication with the reaction chamber (2). It is worth noting that the use of the article "a" means "at least one" and hence a triphasic bioreactor according to the invention may advantageously comprise more than one reaction chamber, and/or more than one liquid and gas outlet and inlets. The liquid inlet (5) is for receiving the liquid (3) and filling the reaction chamber (2). The reaction chamber (2) is made of an appropriate material that could be glass, plastic, stainless steel, a synthetic polymer or other suitable material.

A gas bubbling means (8) and a retention device (9) are also provided. The gas bubbling means (8) is for receiving the gas (10), or gases, to be treated inside the reaction chamber (2) and for bubbling it into the liquid (3) thereby both dissolving the gas to be treated (10) into the liquid (3) and creating a pressure within the reaction chamber (2). The biocatalysts (4) are chosen so as to be able to biocatalyze a reaction between the gas (10) to be treated and the liquid (3) in order to obtain a treated gas (11) and a solution (12) containing a reaction product. The liquid outlet (6) is for releasing by pressure the solution (12) containing the reaction product while the retention device (9) retains the biocatalysts (4) within the reaction chamber (2). The gas outlet (7) is for releasing the treated gas (11) from the reaction chamber (2).

The triphasic bioreactor (1) preferably includes a pressure regulating valve (13) to control the pressure created by the gas (10) bubbled into the reaction chamber (2). The pressure regulating valve (13) may be located in the gas outlet (7). The triphasic bioreactor (1) may also include a valve (14) at the liquid outlet (6) and/or at the liquid inlet (5) for regulating the flow of liquid (3) into and out of the reaction chamber (2). As will become more apparent further along in the description, these features are used for both regulating the pressure inside the reaction chamber (2) so as not to exceed the pressure limits the apparatus may withstand, but also to better control the pressure release of the solution (12) containing the reaction product.

As shown in FIG. 2, the triphasic bioreactor (1) may include a mixer (15) within the reaction chamber (2) to mix the liquid (3), the biocatalysts (4) and the gas (10). Any type of mixer known in the art could be used. For example, as shown in FIG. 2, the mixer (15) might include an axial propeller (16) operatively connected to a top cover (18) of the reaction chamber (2) by means of a driving shaft (17). In such a case, the bioreactor also comprises a suitable driving means for driving the shaft into rotation.

In order to drive forward the reaction between the gas to be treated (10) and the liquid (3), the biocatalysts (4) must comprise a molecule capable of reacting with the substrates, namely the dissolved gas (10) and the liquid (3), so as to yield a treated gas (11) and a solution (12) containing a reaction product. Biocatalysts comprising such a molecule may be selected from a wide variety of biological materials including enzymes, liposomes, microorganisms, animal cells and/or plant cells and the like. Fractions, complexes or combinations thereof may also be used simultaneously. Fractions of enzymes may comprise, for example, specific sub-units of an enzyme, such as its catalytic sub-units. Fractions of a microorganism, animal or plant cell may comprise, for example, specific sub-cellular organelles or compartments such as cellular membranes, ribosomes, mitochondrial, chloroplasts or fractions such as cytoplasmic or nuclear extracts. For the purpose of the invention, the biocatalysts may also be entrapped in a porous substrate, for example, an insoluble gel particle such as silica, alginate, alginate/chitosane, alginate/carboxymethylcellulose, etc. For the purpose of the invention, biocatalysts may also be immobilized on solid packing in suspension in the liquid, such as enzymes covalently bound to plastic packing. Alternatively, enzymes might be in a free state, or chemically linked in an albumin or PEG network. All of these biological materials, which may be obtained through routine methods that are well documented in the scientific literature and known to the person skilled in the art, may be made of use with the present invention which is quite versatile.

Retention of the biocatalysts (4) inside the reaction chamber (2) is an important feature of the invention as biological materials are often quite expensive. In order to allow the pressure release of solution (12) containing the reaction product whilst retaining the biocatalysts (4) within the reaction chamber (2), the retention device (9) must be adapted according to the relative and respective sizes of the reaction products and the biocatalysts (4), as well as co-factors when appropriate.

Pressure release of the solution (11) containing the reaction product may be likened to pressure filtration such as ultrafiltration or microfiltration, which are defined as the action of filtering a solution through a fine membrane by pressure. "Ultrafiltration" is a term which is, in the strict sense, reserved for the physical separation of particles of 0,005 to 0,1 µm in size.

Although, in a variety of its embodiments the present invention may make use of ultrafiltration or microfiltration membranes (19) (20), as shown in FIGS. 2–6, it is by no means restricted to their use. For instance, depending upon the size of the biocatalysts and reaction product, an appropriate retention device (9) may comprise a simple grid and/or perforated base, at the bottom of the reaction chamber (2), as shown in FIG. 1, for slowing the flow of solution (11) containing the reaction product from the reaction chamber (2) whilst retaining the biocatalysts (4) inside the reaction chamber (2).

In the present invention, pressure is generated within the reaction chamber (2) by bubbling the gas to be treated (10) into the liquid (3). This pressure contributes to the dissolution of the gas to be treated (10) inside the liquid (3) containing the biocatalysts (4) and therefore to its further physico-chemical transformation. The partial pressure inside the reaction chamber (2) is greater on one side of the retention device (9). There is consequently greater dissolution of gas to be treated according to the law of dissolution of gases, known as the law of Henry, which states that the concentration of a given dissolved gas is proportional to its partial pressure in the atmosphere at the surface of the liquid. As stated above, the retention device (9) preferably comprises a filter (19). If the biocatalyst materials are sub-microns particles, for example in the range of 0,005 to 0,1 μm in size, a membrane filter is preferably used. Such a membrane filter may be made of cellulose, nylon, polymethyl methacrylate, PVDF or the like, with pores having a smaller diameter than the diameter of the biocatalysts, and co-factors when appropriate.

As shown in FIGS. 1, and 3 to 5, the membrane filter (19) may be integrated inside the reaction chamber (2) upstream from the liquid outlet (6). In such an embodiment, the liquid flows perpendicularly to the filter (19) as in classic frontal filtration. Appropriate pore size allows permeate liquid (12) to exit through the filter (19) exempt of biocatalysts (4). The solution (12) containing the reaction product must therefore pass through the filter (19) first in order to be able to exit the reaction chamber (2) via the liquid outlet (6). The permeate liquid (12) or filtrate released may then be discarded or conveyed/piped to other treatment units for further treatment such as decantation, ion exchange, etc.

Figure 5:
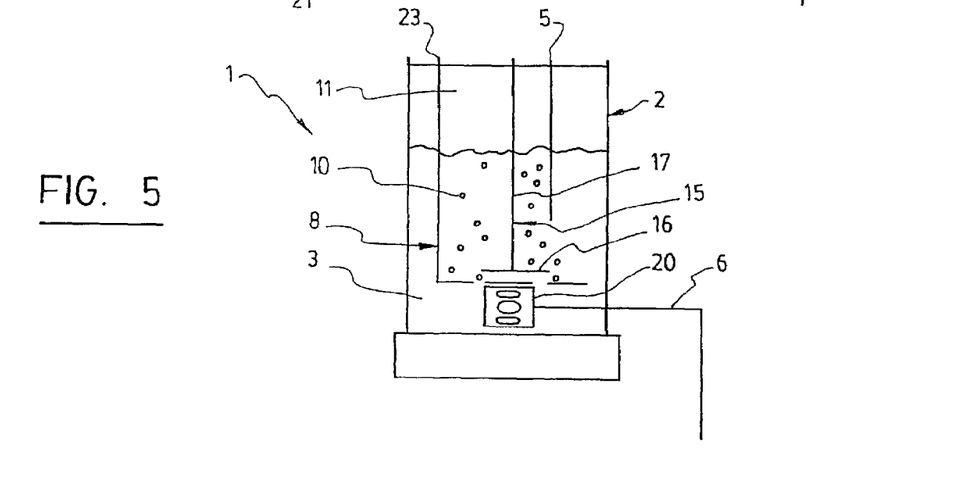
FIG. 5 is a schematic side view of a triphasic bioreactor according to a still further embodiment, having a filter cartridge.

Alternatively, the bioreactor (1) may include an integrated filter cartridge (20) fixed inside the reaction chamber (2) and positioned at the desired height within the reaction chamber (2), as shown in FIG. 5. The filter cartridge (20) is linked directly to the non-pressurized liquid outlet (6) and allows for filtration of the solution (11) containing the reaction product, but not the biocatalysts (4), directly into the liquid outlet (6). As mentioned above, the pore size of the membrane (19) inside the cartridge (20) is dependent upon both the size of the biocatalysts (4) and the reaction product, as well as co-factors when appropriate.

Figure 4:
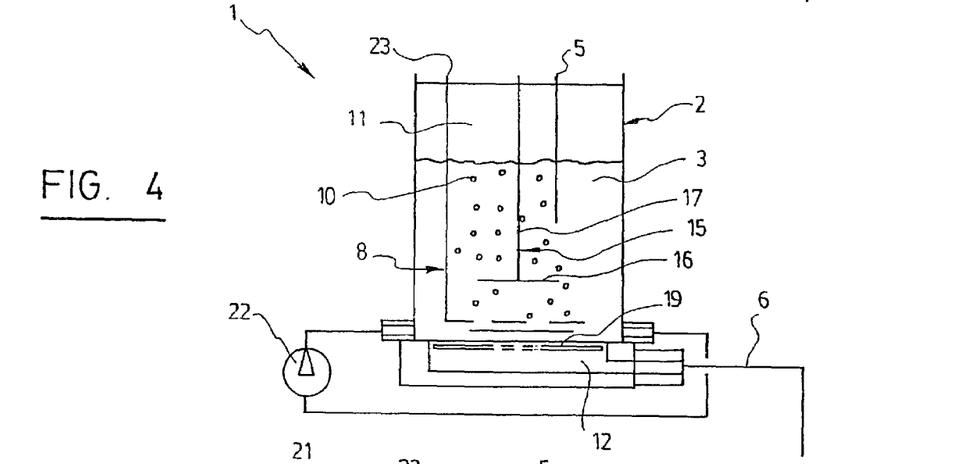
FIG. 4 is a schematic side view of a triphasic bioreactor according to a further embodiment, having an integrated tangential flow filter.

Optionally, the bioreactor (1) may also incorporate a closed loop circuit (21) including a pump (22) to circulate liquid tangentially to the membrane (19), as shown in FIGS. 2 and 4. This particular embodiment of the invention is different because instead of being perpendicular to the filter, the flow of liquid is "tangential" relatively to the filter membrane (19). Liquid therefore "sweeps" the filter membrane (19) tangentially thereby promoting recirculation of the liquid (3) and the biocatalysts (4). The captive biocatalysts (4) therefore remain in liquid suspension. Clogging of the pores of the membrane filter is consequently considerably reduced.

Figure 6:
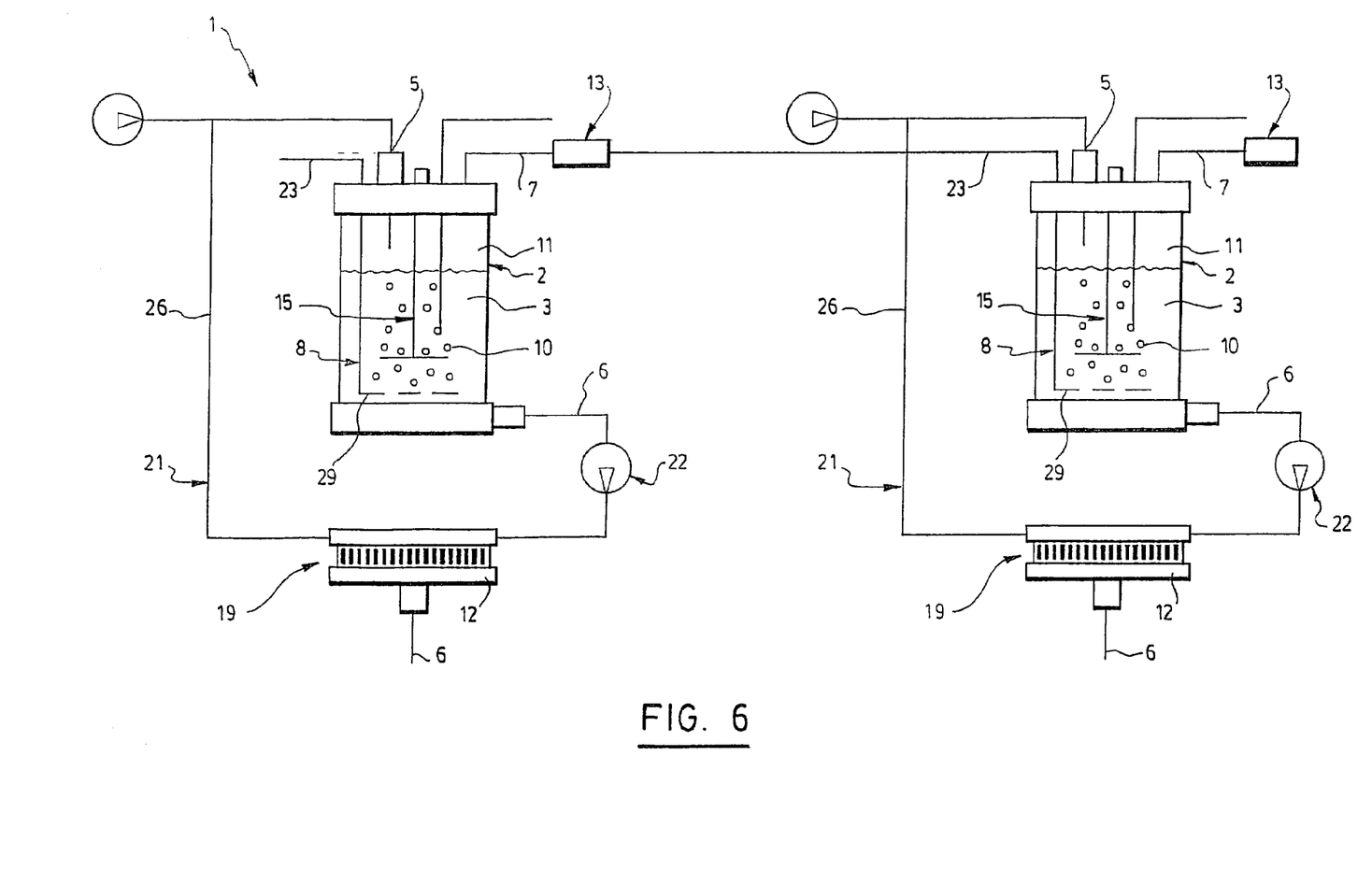
FIG. 6 is a schematic side view of a series of linked triphasic bioreactors for the treatment of gas effluent.

In accordance with a second preferred embodiment of the invention, the membrane filter (19) may be located outside of the reaction chamber (2), as shown in FIGS. 2 and 6. According to this particular embodiment, the retention device (9) will further include a first pipe (22), or any other means adapted to convey a liquid, for piping the solution (12) containing biocatalysts (4) and reaction products from the liquid outlet (6) of the reaction chamber (2) to the membrane filter (19) where a permeate liquid (12) e.g. the solution (12) containing the reaction products, is separated from the retentate liquid (26) containing the biocatalysts (4). In such an embodiment, the retention device (9) further comprises a second pipe for piping the retentate liquid (26) back to the liquid inlet (5) and into the bioreactor's reaction chamber (2). The permeate liquid (12) may be discarded, or conveyed/piped to other treatment units for further treatment such as decantation, ion exchange etc.

An important feature of the invention is the gas bubbling means (8). In one embodiment of the triphasic bioreactor, the gas bubbling means (8) preferably comprises a bubbler (24) or a number of these, as shown in FIG. 1, located in the bottom portion of the reaction chamber (2). The bubbler (24) has a gas inlet (29) connected to a gas inlet (23) of the reaction chamber (2) by means of a suitable pipe (27), to receive the gas effluent (10) to be treated .The bubbler (24) also comprises a plurality of gas outlets (28) to diffuse the gas in the reaction chamber (2).

As shown in FIG. 1, the gas bubbling means may include a bubbler (24) in the form of a removable cap, made of a foam-like material, covering a gas outlet nozzle, at the bottom portion of the triphasic bioreactor (2). Foam-like material is advantageous as it provides the plurality of gas outlets (28) needed to diffuse very fine bubbles and contributes to their uniform distribution within the liquid (3) containing the biocatalysts (4). The reduction in size of the gas bubbles enhances both gas dissolution and contact surface between gas (10) and liquid (3) phase reactants and the biocatalysts (4). As stated above, the inventions may include a mixer (15) in order to enhance the uniform distribution of gas (10) bubbles and biocatalysts (4) within the liquid (3).

The relative size and dimensions of the reaction chamber (2), as well as the relative porosity of the filter membranes used, if any, is dependent upon particular usage requirements and directly proportional to the liquid flow rates required. As expected, liquid flow rates may vary greatly between different applications. Appropriate dimension adjustments and allowances should therefore be made when passing from one type of application to the other.

In accordance with a preferred aspect of the invention, the triphasic bioreactor is used for removing carbon dioxide from a gas effluent (10) containing carbon dioxide. In such a case, the liquid (3) filling the reaction chamber (2) is an aqueous solution, preferably water, and the biocatalysts (4) are enzymes capable of catalyzing the chemical conversion of the dissolved carbon dioxide into an aqueous solution (12) containing hydrogen ions and bicarbonate ions. The enzymes are, preferably, carbonic anhydrase.

The transformation of $CO_2$ into bicarbonate ions, usually a slow naturally occurring process, is catalyzed by the enzyme in suspension in the reaction chamber (2). Without catalysis, the equilibrium reaction must undergo an intermediate hydration that slows the transformation of $CO_2$ into bicarbonate ions. The following equations describe the relevant processes:

without enzyme: dissolved $CO_2 \rightarrow H_2CO_3 \rightarrow H^+ + HCO_3^-$     (I)

with enzyme: dissolved $CO_2 \rightarrow H^+ + HCO_3^-$     (II)

The enzyme carbonic anhydrase, which is of relatively low molecular weight (30,000 daltons), may be made to form part of a complex in order to increase its size. This, in turn, allows the use of membranes with greater porosity and enhances liquid flow rates. Different types of enzyme complexes may be formed. Among these are those using whole cells such as red blood cells. However, with red blood cells, the enzymes rapidly leak out and are lost. Encapsulation techniques may therefore overcome this problem. Enzymes may be immobilized on solid packing. Packing made of polymers such as nylon, polystyrene, polyurethane, polymethyl methacrylate, functionnalized silica gel, etc. may be used. Enzymes may also be entrapped in insoluble gel particles such as silica, alginate, alginate/chitosane or alginate/carboxymethylcellulose, etc. or covalently linked or non covalently linked in a network of albumin, PEG or other molecule. Such a network constitutes a loose type network. It may appear as a cloudy suspension, "filaments" of which are often visible to the naked eye. For the purpose of the invention, alginate particles should preferably possess a diameter comprised in a range from 1 to 9 mm, and preferably, a diameter inferior to 3 mm.

Thanks to the different features of the triphasic bioreactor, such as the bubbling means and the enclosed reactor filled with the aqueous liquid, the pressure obtained inside the reaction chamber(2) permits the gas effluent containing carbon dioxide to rapidly dissolve into the liquid (3) which contains the carbonic anhydrase biocatalysts (4), thereby optimizing the reaction conditions of reaction (II). A tangential flow filtration system, such as shown in FIGS. 2, 4 and 6, allows the solution (12) containing the bicarbonate ions to be released from the reaction chamber (2) while part of the liquid containing the carbonic anhydrase biocatalysts (4) is returned to the reaction chamber (2).

In order to better monitor the parameters of the reaction process such as pH, temperature, reaction by product concentration, etc., the triphasic bioreactor (1) may incorporate a sampling means (25) for sampling and analyzing liquid from inside the reaction chamber, as shown in FIG. 2. As well, thermoregulation circuits may be added onto the reaction chamber in order to optimize temperature conditions. Gas composition analyzers may also be provided at the gas inlet (5) and/or outlet (7). Additional valves may also be added onto the liquid and gas inlets and outlets in order to better regulate the flow rates of the different phases, the level of liquid inside the reaction chamber, the pressure inside the reaction chamber, etc.

In yet another embodiment, the invention may consist in a series of reaction chambers (2), with one or more additional reaction chambers, as shown in FIG. 6. These may be linked so as to treat gas simultaneously or sequentially. In reaction chambers linked in succession, as shown in FIG. 6, the gas outlet (7) which releases the treated gas from one reaction chamber (2) may be linked in fluid communication to the next reaction chamber (2) through its gas inlet (23). This allows for further or extensive treatment of the gas. The number of reaction chambers therefore depends on the extent of gas treatment required. Extensive or further treatment might entail treating the gas repeatedly in successive reaction chambers, all of which contain the same biocatalysts. However, extensive or further treatment might also entail different treatments in succession, the particular biocatalysts varying from one reaction chamber to the next. Therefore biocatalysts in one reaction chamber may be different from the biocatalysts in the other reaction chamber(s) in such a series.

Another object of the invention is to provide a triphasic process for physico-chemically treating a gas effluent. The process of the invention is basically a three-step process. First, a reaction chamber, filled with the biocatalysts (4) in suspension in the liquid (3), is provided. Second, the gas to be treated (10) is bubbled into the liquid (3) in the reaction chamber (2) in order to dissolve the gas to be treated (10) into the liquid (3) and to increase a pressure within the reaction chamber (2). Bubbling thereby promotes the biocatalytic reaction between the liquid (3) and the gas (10) in order to obtain a treated gas (11) and a solution (12) containing a reaction product. Third, the solution (12) containing a reaction product is pressure released from the reaction chamber (2) whilst retaining the biocatalysts (4) within the reaction chamber (2). All the while during the second and third steps, the pressure is controlled within the reaction chamber (2) and a treated gas (11) is released from the reaction chamber (2).

In yet another embodiment of the invention, the last step of the process may occur through ultrafiltration. The ultrafiltration may be conducted either inside or outside of the reaction chamber.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A triphasic bioreactor for physico-chemically treating a gas containing carbon dioxide, comprising:
    a reaction chamber filled with an aqueous liquid;
    biocatalysts consisting of carbonic anhydrase in suspension in the liquid for catalyzing the chemical conversion of dissolved carbon dioxide into an aqueous solution containing hydrogen ions and bicarbonate ions, hereinafter referred as to the reaction products;
    a liquid inlet in fluid communication with the reaction chamber for receiving the liquid and filling the reaction chamber;
    a gas bubbling means in the reaction chamber for bubbling the gas to be treated into the liquid thereby dissolving the carbon dioxide into the liquid, and increasing a pressure inside the reaction chamber;
    a liquid outlet in fluid communication with the reaction chamber for releasing said aqueous solution containing the reaction products;
    a gas outlet in fluid communication with the reaction chamber to release a treated gas; and
    a retention device to retain the biocatalysts in the reaction chamber.

2. A triphasic bioreactor according to claim 1, comprising a pressure regulating valve to control a pressure created by the gas bubbled within the reaction chamber.

3. A triphasic bioreactor according to claim 1, wherein the pressure regulating valve is located in the gas outlet.

4. A triphasic bioreactor according to claim 1, wherein the biocatalysts are present in the bioreactor as complexes of said biocatalysts; and the retention device comprises a filter having pores with a smaller diameter than a diameter of said complexes.

5. A triphasic bioreactor according to claim 4, wherein the filter is a membrane filter.

6. A triphasic bioreactor according to claim 5, wherein the membrane filter is located inside the reaction chamber upstream from the liquid outlet.

7. A triphasic bioreactor according to claim 6, comprising a closed loop circuit including a pump to circulate liquid tangentially to the membrane.

8. A triphasic bioreactor according to claim 5, wherein the membrane filter is located outside the reaction chamber and the retention device further comprises:
    a first piping means for piping liquid, which contains biocatalysts and reaction products, from the liquid outlet of the reaction chamber to the membrane filter where a permeate liquid containing the reaction products is separated from a retentate liquid containing the biocatalysts; and
    a second piping means for piping the retentate liquid to the liquid inlet of the bioreactor.

9. A triphasic according to claim 4, wherein said complexes of biocatalysts are selected from the group consisting of biocatalysts entrapped in a porous substrate, biocatalysts immobilized on a solid substrate and biocatalysts link in a network o molecules in suspension.

10. A triphasic bioreactor according to claim 1, wherein the gas bubbling means
   a gas inlet of the reaction chamber to recieve the gas effluent;
   a bubbler located in a bottom portion of the reaction chamber having:
      a gas inlet connected to the gas inlet of the reaction chamber; and
      a plurality of gas outlets to diffuse the gas in the reaction chamber; and
   a pipe to connect the gas inlet of the reaction chamber to the gas inlet of the bubbler.

11. A triphasic bioreactor according to claim 1, comprising a valve at the liquid outlet and/or at the liquid inlet for regulation a flow of liquid in and out of the reaction chamber.

12. A bioreactor according to claim 1, comprising a sampling means for sampling and analyzing liquid from the reaction chamber.

13. A bioreactor according to claim 1, comprising an additional reaction chamber as defined in claim 1, in series with said reaction chamber, hereinafter referred as the first reaction chamber, to further treat said treated gas.

14. A bioreactor according to claim 13, wherein the biocatalysts filling the first reaction chamber are different from the biocatalysts filling the additional reaction chamber.

* * * * *

UNITED STATES PATENT AND TRADEMARK OFFICE
CERTIFICATE OF CORRECTION

PATENT NO. : 7,176,017 B2
APPLICATION NO. : 10/195848
DATED : February 13, 2007
INVENTOR(S) : Parent et al.

It is certified that error appears in the above-identified patent and that said Letters Patent is hereby corrected as shown below:

In column 1, line 18 "greenhouse" should be --green-house--.

In column 1, line 53 after "that" --,-- should be inserted.

In column 1, line 57 "5,250;305" should be --5,250,305--.

In column 4, line 38 "three step" should be --three-step--.

In column 6, line 17 "mitochondrial" should be --mitochondria--.

In column 8, line 17 "inventions" should be --invention--.

In column 11, line 1, claim 9, line 1 after "triphasic" --bioreactor-- should be inserted.

In column 11, line 4, claim 9, line 4 "link" should be --linked--.

In column 11, line 5, claim 9, line 5 "o" should be --of--.

In column 11, line 7, claim 10, line 2 after "means" --comprise:-- should be inserted.

In column 12, line 3, claim 11, line 3 "regulation" should be --regulating--.

Signed and Sealed this

Fourteenth Day of August, 2007

JON W. DUDAS
*Director of the United States Patent and Trademark Office*